UNITED STATES PATENT OFFICE.

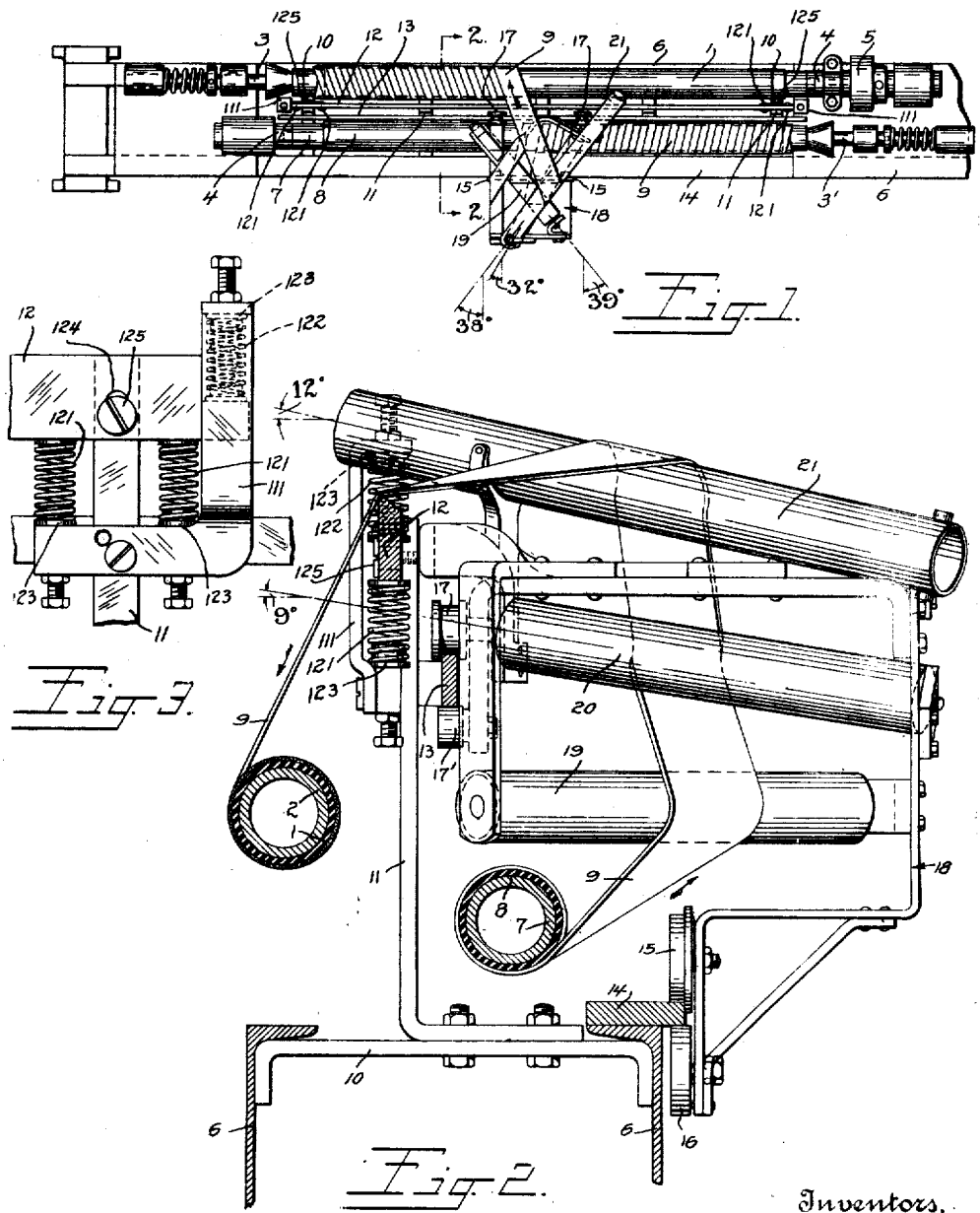

THOMAS A. JORDAN AND ASA E. CAESBER, OF INDIANAPOLIS, INDIANA, ASSIGNORS TO G. & J. TIRE COMPANY, A CORPORATION OF INDIANA.

METHOD AND APPARATUS FOR WRAPPING UNCURED TUBES FROM CURED TUBES.

1,405,418. Specification of Letters Patent. Patented Feb. 7, 1922.

Continuation of application No. 401,244, filed August 4, 1920. This application filed May 4, 1921. Serial No. 466,794.

*To all whom it may concern:*

Be it known that we, THOMAS A. JORDAN and ASA E. CAESBER, both citizens of the United States, and residents of Indianapolis, county of Marion, and State of Indiana, have invented certain new and useful Improvements in Methods and Apparatus for Wrapping Uncured Tubes from Cured Tubes, of which the following is a full, clear, and exact description.

This invention relates to the manufacture of tubular articles of rubber composition and particularly to inner tubes for pneumatic tires. And this application is a continuation of our pending and allowed application Serial No. 401,244, filed August 4, 1920.

In the manufacture of inner tubes it is usual to form unvulcanized gum into a cylindrical tube by wrapping a sheet thereof around a pipe or "pole." Heretofore and generally, it has been the practice to tightly wrap a thus formed green tube with fabric wound helically thereon under tension, and with its edges overlapping. The wrapped pole is then placed in a vulcanizer and the tube cured. Afterwards the wrapping strip of fabric is removed and the vulcanized tube stripped from the pole. The wrapping strip, of course, has to be used over and over again, and repeatedly wrapped and unwrapped until it is worn out, such reuse being economically necessary owing to the cost of the wrappers.

The outside edge of the overlapped helically wound strip defines a helix of slightly larger diameter than the inside edge which contacts directly with the stock on the pole. Consequently the outside edge of the strip is stretched or distorted more than the inside edge. When the wrapping strip during vulcanization is subjected to high temperature the relative elongation or distortion of the edges is set or rendered permanent. Hence the necessity for applying the strip to an uncured tube in the same relation as it had to the cured tube about which it had been previously wrapped, if, of course, the strip is to be used again and again until worn out, as is essential to economical production of inner tubes from a commercial standpoint.

The removal of the strip of fabric after curing the tube, according to the prior practices, has been accomplished by spooling up on a short stick or mandrel. And recently it has been proposed to unwind the fabric strip from the cured tube helically onto a bare pole known as a "dummy." In either case a strip so removed may be reapplied to an uncured tube preparatory to its vulcanization in substantially the relation it comes off of the cured tube. This latter is therefore important and essential to the successful commercial manufacture of tubes especially when repeated subjection of the wrapping strip to wetting and curing treatments increases or aggravates the inequalities in the length of the edges of the strip and makes it more difficult to apply the same smoothly to the green tubes.

The present invention contemplates a method and apparatus for manipulating the strip in such a way as to permit of its application to an uncured tube on a pole from a cured tube in a single operation and of its application over and over again to the tubes until worn out. It further aims to provide a method and apparatus for wrapping and unwrapping inner tubes smoothly and without wrinkles that might cause indentations or blemishes in the product. It aims to avoid a step in the prior practices and furthermore to reduce the wear and tear on the wrapping strip. It further contemplates an apparatus for attaining the above objects which permits of simultaneously wrapping and unwrapping different sized tubes.

With the embodiment of the invention illustrated in the drawings in mind, and without intention to needlessly limit ourselves, the invention may be said to consist essentially of a lathe having spindles for supporting a pair of poles in parallelism, one of which is adapted to be driven, in combination with an inverting device for giving the strip a half turn in its passage from cured to uncured tubes on poles. The method contemplates a smooth wrapping of uncured tubes simultaneously with the unwrapping of a cured tube.

These are the objects of our invention and other objects thereof will appear in the following detailed description of the accompanying drawings, in which:

Fig. 1 is a plan view of a lathe with a strip inverting appliance arranged in operative position thereon, and Fig. 2 is a cross-section on the line 2—2 of Fig. 1, Fig. 3 is an elevation of a yieldable support for a smoothing bar.

In the embodiment of the invention illustrated in the drawings, which are illustrative merely of its underlying principles, a green or unvulcanized tube 1 is mounted on a pole 2 which is rotatably supported between a yielding cone carrying spindle 3 and a socketed spindle 4 which is adapted to be driven in any suitable manner as by a pulley 5. The various parts are suitably supported on a body or frame 6 of a lathe, which has arranged thereon in a generally parallel relation a similar set of spindles 3' and 4' supporting in a freely rotatable manner a second pole 7 carrying a rubber tube 8 that has been vulcanized while wrapped in overlapping helical convolutions of a strip 9. The afore-mentioned parts are of old and well-known construction.

Supported by cross bars 10 between members of the frame 6 are a suitable number of brackets 11 sustaining horizontally a tension or smoothing bar 12. The bar 12 may be secured rigidly in place but preferably, as shown, is yieldably supported on opposed coiled springs 121 and 122, in sets of three, two below and one above the bar. Each spring reacts against an adjustable abutment 123. The bar 12 may be guided in any suitable manner as by slotting it at 124 to receive a stud-screw 125. The adjustable abutments are threaded in an auxiliary bracket 111 which is suitably secured to the main bracket 11. Any suitable number of these sets of three springs may be employed, one at each end of the bar 12 as illustrated in Fig. will suffice. On one side of the brackets 11, guides or rails 13 and 14 are provided for a carriage indicated generally by the numeral 18, the former being mounted on the brackets 11 and the latter on the upper surface of the frame 6, preferably overhanging one edge thereof. Rollers 15, 16, 17 and 17' are adapted to track the rails 13 and 14 and permit movement of the carriage thereealong. Suitably mounted on the carriage 18 are a pair of inclined cylindrical rolls 19 and 20 and a guide 21. While it is preferred to permit the rolls 19 and 20 to freely rotate and to hold the guide 21 stationary, they may be otherwise supported if desired. For instance all of these parts may be permitted to rotate or they may all be made stationary. The members 19 to 21 are preferably inclined to one another at the angles indicated on the drawing, but obviously their inclination both horizontally and vertically may be varied as desired to handle wrapping strips of different widths or to vary the pitch of the helical wrapping. And if desired the supports for the several members 19—20—21 may be made adjustable in any suitable manner to adapt a single machine for handling all sizes of tubes and to facilitate the setting up of the machine.

The carriage 18 is freely movable along the rails 13 and 14 in parallelism with the poles 2 and 7. But it may, if desired, be moved automatically lengthwise of the machine. The illustrated construction, however, is deemed preferable because it permits proper wrapping of an uncured tube of a different size from the cured tube being unwrapped. For quantity production, however, it may be found desirable to actuate the carriage 18 mechanically after the fashion of the carriage on a metal lathe.

In operation a helically wrapped and previously vulcanized tube on a pole is positioned as indicated at 7—8 on the drawings. The fabric 9 is conducted therefrom around the members 19, 20 and 21 as illustrated in Fig. 2 of the drawings, thence over the tension or smoothing bar 12 to the uncured tube on the adjacent parallel pole 2. At the start of the operation the carriage 18 is located adjacent the ends of the poles and when the pole carrying the uncured tube is started rotating, the wrapper 9 is applied thereto in substantially the condition is comes off of the cured tube. As the operation proceeds the carriage 18 travels or shifts lengthwise of the lathe. In the operation of the machine illustrated in the drawings, the operator of the machine is not required to exert himself to any extent to shift the carriage 18 and with suitable anti-friction devices the carriage may be rendered automatic in operation, that is, it may be shifted by the fabric as the wrapping and unwrapping proceeds, at least during the major portion of the operation. By the yieldable support for the bar 12, the strips 9, on suddenly initiating the wrapping operation, are prevented from breaking across the smoothing edge. And any sudden stress on the strips 9 is also relieved by the spring 121.

From the above detailed description it will be seen that I have provided a machine or apparatus which is simple and efficient in operation. It gives a half turn or twist to the tape to insure that the elongated edge comes to the outside of the uncured tube and the shorter edge comes to the inside in exactly the condition that experience has shown to be necessary to the smooth wrapping of tubes and so that the product will not be blemished.

It will be obvious that many changes may be made in the construction of the apparatus to obtain smooth wrapping simultaneously with the upwrapping of the fabric from a cured tube. While it is preferred to support the poles on which the cured and uncured tubes have been formed in parallelism and to manipulate the strip in its passage from one to another so as to apply it hel cally to the green tube with the same edge in contact with the rubber, it is obvious that the poles may be disposed at an angle to one another and more or less twist given the strip to attain the same end. The method might be practiced by manually inverting the strip in its passage from one pole to the other and some of the advantages of the invention realized but such a process is within the broad principles of my invention as it is understood. The invention is therefore not limited to the details of the method and apparatus shown and described in detail, and reference should be made to the accompanying claims for an understanding of its scope.

While we have described the principle of the invention in the specification and in the claims by reference to the distortion in the edges of the strip relative to one another, it is to be understood that the term "edges" does not refer to a line defined by the sides of the strip but rather to a marginal portion whose width is an appreciable fraction of the total width of the strip. The width of the portion of the strip in direct contact with the rubber varies in practice from say one-sixth to one-third the total width of the strip.

And while the distortion, or unequal edge stretching, is most troublesome in manipulating strips that have been repeatedly subjected to curing treatment, difficulty may also be encountered in wrapping from a green tube that has not been subjected to curing treatment being, for instance, stored away for an hour or so after wrapping to allow the rubber composition to set while confined and compacted by the spiral convolutions of the strip that is ordinarily moistened and applied under tension. The spirally coiled, moistened and tensioned strip is likely to have its respective edges stretched unequally regardless of whether or not it is cured before the wrapper is removed. The present invention, therefore, is intended to comprehend manipulation of strips however their edges have become unequally distorted, or stretched, if, and provided, it is necessary, in order to eliminate wrinkles in the wrapping strip, to spirally wrap the strip with its edges in the same relation to the respective composition tubes and overlapping.

Having thus described our invention, what we claim and desire to protect by Letters Patent is:

1. The method of manipulating fabric in the manufacture of tubular articles of vulcanizable rubber composition which consists in simultaneously and repeatedly removing a helically wound and overlapping strip of flexible material from a cured article and applying it smoothly to an uncured article, regardless of inequalities in the length of the respective edges of the strip consequent upon its repeated subjection to curing heats.

2. The method of manipulating fabric in the manufacture of tubular articles of vulcanizable rubber composition which consists in simultaneously unwrapping and wrapping a strip of fabric from and onto cured and uncured tubes respectively with one and the same edge of the strip overlapping the other edge thereof throughout substantially the length of the tubes at the beginning and at the ending of the operation.

3. The method of manipulating fabric in the manufacture of tubular articles of vulcanizable rubber composition which consists in simultaneously unwrapping and wrapping a strip of flexible material from and onto cured and uncured tubes respectively with the edges of the strip in the same relation to the composition tubes and overlapping.

4. The method of manipulating fabric in the manufacture of tubular articles of vulcanizable rubber composition which consists in inverting a warped strip of flexible material, whose edges are of unequal length and more or less circular and concentric, while wrapping it helically with its edges overlapping about an uncured tube and from a tube previously cured with said strip in constricting overlapped helical convolutions thereabout.

5. The method of manipulating fabric in the manufacture of tubular articles of vulcanizable rubber composition which consists in simultaneously unwrapping and wrapping a strip of flexible material from and onto cured and uncured tubes respectively while twisting the strip through an angle of 180° and overlapping its edges.

6. A wrapping apparatus having a plurality of parallel pole supports, in combination with means movable longitudinally of the apparatus for half turning a strip conducted from one to another of the poles that may be supported by said pole supports.

7. A wrapping lathe having a plurality of pole supports for sustaining poles in parallelism, in combination with inverting traverse mechanism supported by said lathe.

8. A wrapping lathe having a plurality of pole supports for demountably sustaining poles in parallelism in combination with a traverse mechanism comprising a plurality of inverting members arranged at an inclination to the axes of said pole supports and to each other.

9. A traverse mechanism for wrapping lathes comprising a shiftable carriage, and strip turning members thereon arranged at an inclination to one another.

10. A wrapping lathe having a plurality of spindles for supporting poles in parallelism, in combination with a strip inverting traverse mechanism, and a smoothing member arranged to act upon a strip intermediate the traverse mechanism and one of the poles supported by said spindles.

11. A wrapping lathe having a plurality of pairs of pole supports, means for rotating at least one of said pole supports, in combination with a shiftable strip inverting traverse mechanism sustained by said lathe, said pole supports being arranged substantially in parallelism, and said strip inverting traverse mechanism being movable in a direction substantially parallel with the axes of said pole supports.

12. The method of manipulating fabric in the manufacture of tubular articles of vulcanizable rubber composition which consists in simultaneously unwrapping and wrapping a strip of fabric from and onto cured and uncured tubes respectively with one and the same edge of the strip overlapping the other edge thereof throughout substantially the length of the tubes at the beginning and at the ending of the operation but with opposite faces contacting the respective tubes.

13. A wrapping lathe having a plurality of spindles for supporting poles in parallelism, in combination with a strip inverting traverse mechanism, and a yieldably supported smoothing member arranged to act upon a strip intermediate the traverse mechanism and one of the poles supported by said spindles.

14. That method of manipulating fabric strips in the manufacture of tubular articles of plastic composition so as to permit repeated use of the strip without blemishing the articles which consists in simultaneously wrapping the strip in overlapping spiral convolutions about one of the tubular articles and unwrapping it from a second tubular article, the same edge of the strip being overlapped and exposed in repeated use.

Signed at Indianapolis, Indiana, this 29th day of April, 1921.

THOMAS A. JORDAN.
ASA E. CAESBER.